March 12, 1957 G. J. ARNETT 2,785,273
AIR CONDITIONING
Filed July 2, 1954
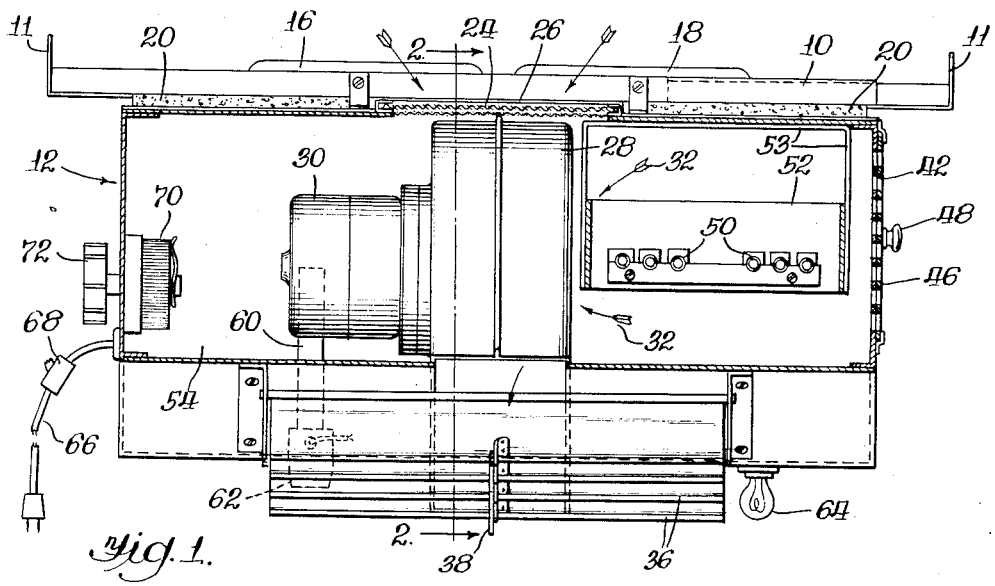
Fig. 1.
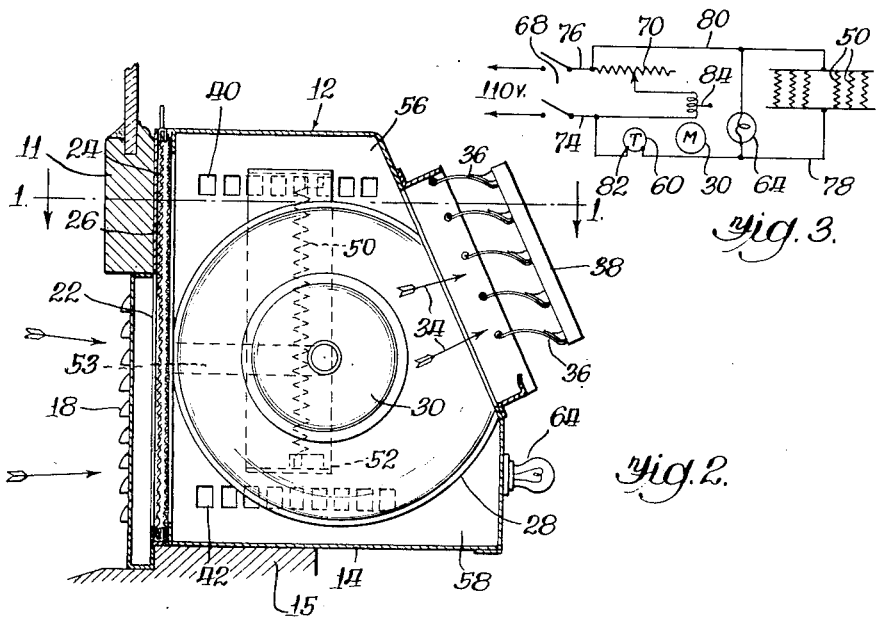
Fig. 2. Fig. 3.
Fig. 4.
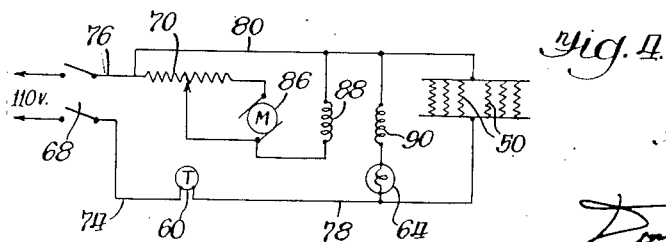
INVENTOR.
Gordon J. Arnett
BY
Donald A. Sweet Atty

# United States Patent Office 2,785,273
Patented Mar. 12, 1957

2,785,273

AIR CONDITIONING

Gordon J. Arnett, Chicago, Ill.

Application July 2, 1954, Serial No. 441,007

11 Claims. (Cl. 219—39)

My invention relates to air conditioning and includes among its objects and advantages an extremely simple way of securing a desirable functioning cycle in the warming of filtered air in cool weather, and an extremely simple and cheap embodiment of unitary apparatus for practicing the invention.

In the accompanying drawings:

Figure 1 is a plan view, partly in section on line 1—1 of Figure 2 of a unit according to the invention;

Figure 2 is a transverse section of the same unit, in a vertical plane on line 2—2 of Figure 1, with the blower in elevation;

Figure 3 is a wiring diagram; and

Figure 4 is a modified wiring arrangement.

In the embodiment selected for illustration of the invention, the unit comprises a high, shallow, telescoping channel 10 adapted to be inserted under the partly opened window sash 11, and a main housing 12 rigid with the channel. The bottom 14 of the housing normally rests on the windowsill 15, and the assembly is held in place by bringing the window sash 11 down in contact with it from above. This is a conventional type of mounting for window units of various types.

The web of channel 10 has two sets of louvers 16 and 18, and the space inside the channel is closed, as by a suitable insulating panel 20, except in the middle, where the opening 22 exposes the lower portion of a conventional oil-impregnated filter element 24, which may be set in place from above by sliding it down through a channel-shaped guide and retainer 26. Centrally located inside the housing 12 is the housing 28 of air circulating means in the nature of a rotary blower, or fan, driven by the electric motor 30. The blower withdraws air from the interior of the housing 12 longitudinally, as indicated by arrows 32 in Figure 1, and expels it radially, as indicated by arrows 34, through an adjustable shutter having blades 36 and adjusting bar 38. At one end of the housing 12 I provide an upper inlet grille 40 and a lower inlet grille 42, in the nature of a series of openings through the end wall of the casing, which openings may be adjustably controlled by the operator by adjusting the cover slide 46 (see Figure 1) by means of the adjustment button 48. It will be apparent that with the grilles 40 and 42 completely closed, all the air expelled at 34 will be drawn in from outside. It is easy to design the parts so that with the grilles 40 and 42 wide open, practically no air drawn in will be from outside, due to the greater resistance of the filter 24, but all the air drawn in will be from the air in the room, through the grilles. Any intermediate condition is readily available to the user.

Heating means are provided, illustrated as six vertical helices 50 of resistance wire, mounted in a suitable frame 52 supported by a bracket 53 in the space at the right end of the housing in front of the inlet to the blower.

The space at 54 in the left end of the housing is of the same order of magnitude as the space in the other end of the housing, but it is largely cut off from longitudinal communication by the blower housing 28. As clearly indicated in Figure 2, there remains an upper passage 56 and a lower passage 58, extending axially past the blower housing 28. When the motor 30 is running and there is a very gentle suction inside the housing sufficient to draw air in through the filter 24, the lower left-hand corner of the filter will permit cool air to enter the housing 12 a little to the left of the blower housing 28, but this entering air is a minor fraction of the total air entering through the filter, and is immediately drawn to the right by the blower. This minor fraction of entering, external air is the only factor tending to cause any circulation in the space 54, except that when the heater is on, the air in the right-hand end of the housing 12 is hotter, and a gentle convection current will tend to move to the left in passage 56 at the top and back to the right in passage 58 at the bottom.

I position a conventional thermostat 60 in the lower portion of the space 54. At the right end of the casing, near the bottom, I position a telltale light 64. The power supply is through a conventional cable 66, including a manual switch 68 for turning the current on and off, and the rheostat 70 is adjustable by the control knob 72, to vary the speed of the motor. Referring now to Figure 3, I have indicated a motor 30 of the single-phase, shaded-pole type, with one of its terminals connected directly to the negative line 74 and the other terminal connected through the rheostat 70 to the positive line 76. The thermostat 60 establishes a connection from the negative line 74 to a conductor 78, which supplies negative potential to the telltale light 64 and the heating resistance 50. Both these units are connected directly back to the line 76 through the return wire 80. When the unit is in operation and under a thermal load such that the heater 50 need not operate continuously to supply the heat required, the arrangement disclosed automatically secures a very advantageous cycle of on-and-off periods and a very advantageous sensitivity to temperature conditions, both inside and outside. Assuming that the thermostat is set for such a temperature that the operation will be intermittent or cyclic, when the current is first supplied, the heater begins to function and the blower begins to circulate air. As the heater gradually heats the air in the casing, the casing itself will warm up, but the temperature of the issuing air at 34 can be, for several minutes, the maximum that the heater is capable of generating, until the conduction of heat through the metal of the casing and the slow and gentle convection current in the passages 56 and 58 has slowly warmed up the relatively stagnant storage volume 54 to such a point that the thermostat turns off the heater. When this occurs, the air discharged at 34 is still warmed by the warm parts of the device, but to a lesser degree, until the device has cooled down enough so that the air in the space 54 cools the thermostat 60 and turns the heater on again. It will be apparent that both the rate of heating during the on-period and the rate of cooling during the off-period will be affected both by the temperature of the air in the room, which has contact over a large area with the entire housing 12, and by the temperature of the outside air, which has contact with the inside of the housing. This provides, for the heater, a fairly slow on-and-off cycle of operation, of several minutes' duration under most conditions, while the blower runs continuously. If the thermostat were subjected to the temperature of the air at 34, as is often done on devices of this type, the cycle would tend to be much more rapid, but the effect would be to come very close to delivering at 34 a substantially constant volume of air at a substantially constant temperature, substantially independent of the temperature of the air in the room and substantially independent of the temperature of the outside air. With the control illustrated, the amount of heat delivered by the unit is not independent of these other factors, and if the user goes to sleep with the unit in operation and subsequently the temperature of the outside air falls, the unit will automatically lengthen the on-period and shorten the off-period as a result. And if, as will usually happen under such circumstances, the temperature of the room itself is also lowered to a lesser degree, the increased cooling exerted by the air in the room on the housing 12 will result in a further additional increment of heating action by the unit, which would not be supplied if the thermostat 60 were sensitive to the discharged air at 34 rather than to the temperature of the unit as a whole.

The type of motor indicated in Figure 3 has the special characteristic that the torque it exerts when the motor is not turning at all, is very low, but as soon as a small increment of acceleration begins to turn the rotor, the magnetic action becomes much more powerful. In units of the type illustrated, it is not at all difficult to design and proportion the parts so that the resistance 70, when the user adjusts it for the slowest motor speed, is just beyond a critical point such that the energy supplied to the motor is not enough to start the motor at all while the bearings are cold and the lubricant in the bearings a little bit stiff. I am thus able, without any complicated or expensive, special controls, to provide a unit in which, when the unit is cold throughout and the user adjusts it for minimum motor speed, he can turn on the unit and the heater 50 will function, but it will be from one minute up to three or four minutes before the electrical heating of the stationary motor, combined with the warming up of the entire unit by heat generated by the resistance 50 and the rheostat 70, gets the motor bearings warmed up enough so that the motor will begin to turn. As soon as the rotor makes an initial movement, even at very slow speed, the motor will then take hold and come up to the adjusted, normal speed. This means that the motor does not blow cold air into the room for the few minutes at the beginning of the operation, at the time when the user wants warm air or none at all.

Others may readily adapt the invention for use under various conditions of service by employing one or more of the novel features involved or equivalents thereof. It may also be desirable in some installations to have the motor 30 run faster when the heater 50 is functioning. This can be easily accomplished with a motor according to Figure 3 by connecting the terminal 82 of the thermostat 60 to an intermediate point 84 in the motor winding, instead of to the negative line 74. Of course, this would require designing the heater 50 to function effectively in series with part of the motor winding. With such an arrangement, the thermostat connects the heater 50 in parallel with the rheostat 70 and part of the motor winding, and thus increases the motor speed, whenever it is not already a maximum.

In Figure 4 I have indicated a commutator-type motor 86, having a normal field winding 88 and a small, reversed winding 90 operating in magnetic opposition to the winding 88 and connected in series with the telltale light 64. It will be obvious that when the thermostat 60 closes its circuit, reduction in field excitation will increase the operating speed of the motor. I have illustrated the insert 24 insertable from above, in a vertical position at that point, while the apparatus remains undisturbed in position and without disturbing the window. It will be obvious that it could also be arranged horizontally just above the bottom of the housing and inserted from the room side of the housing.

During seasons when heat is rarely or never needed, but cooling would be desirable, such a unit may be combined with various conventional means for cooling a gentle stream of air. Even without such positive cooling means, the occupant can increase comfort vary considerably by turning on the blower each evening as soon as the outdoor temperature has fallen materially below the indoor temperature, and simply letting the cool air come in and fill the house. In the forenoon, after the outdoor temperature has risen to the point where outdoor air is not desired, and the occupant closes all the doors and windows, a simple manipulation of the grille will stop the entrance of outdoor air and still provide a comfortable circulation of the inside air.

In climates where it is common to experience a temperature of, say, seventy degrees during the day and forty-five degrees at night, the blower can be left on continuously. As long as the outside air is above the temperature for which the thermostat is set, the device is a mere circulating fan, with no heating action. As soon as the chill of the evening delivers cooler outside air, the heater goes into action.

As at present advised, with respect to the apparent scope of my invention, I desire to claim the following subject matter:

1. Air treating equipment comprising, in combination: a casing; heating means in said casing; a thermostat in said casing for automatically connecting and disconnecting said heating means at predetermined temperatures; a blower for delivering warm air from said casing; a motor for driving said blower; and electrical connections between said motor and said heater arranged to increase the motor speed when the heater is drawing current.

2. Air treating equipment comprising, in combination: a casing; heating means in said casing; a thermostat in said casing for automatically connecting and disconnecting said heating means at predetermined temperatures; a blower for delivering warm air from said casing; a motor for driving said blower; and a rheostat for adjusting the motor speed; said rheostat having a range such that, when the equipment is cold and the rheostat set for minimum speed, the motor torque will not overcome the starting friction until the heater has warmed up the equipment.

3. Air treating equipment comprising, in combination: a housing; means for mounting said housing in the opening made available by a partly opened window sash; a motor and blower centrally located in said housing and subdividing the space in said housing into two portions; an electric heater in one of said portions; said blower being arranged to withdraw air from the portion containing said heater, and expel it from said housing into the room; whereby the remaining portion is a relatively stagnant air space; a control thermostat arranged to connect and disconnect said heater at predetermined thermostat temperatures; said thermostat being located in said relatively stagnant air space; said housing being of material having high thermal conductivity and in contact over its outer surface with the air in the room, and over its inner surface with the air drawn in by the motor; whereby the heat cycle is affected primarily by the temperature of the room air and by the temperature of the air drawn in, and substantially independent of the temperature of the air stream delivered by the blower.

4. Air treating equipment comprising, in combination: a housing; means for mounting said housing in the opening made available by a partly opened window sash; a motor and blower centrally located in said housing and subdividing the space in said housing into two portions; an electric heater in one of said portions; said blower being arranged to withdraw air from the portion containing said heater, and expel it from said housing into the room; whereby the remaining portion is a relatively stagnant air space; a control thermostat arranged to connect and disconnect said heater at predetermined thermostat temperatures; said thermostat being located in said relatively stagnant air space; said housing being in contact with the air in the room, and over its inner surface with the air drawn in by the motor; whereby the heat cycle is affected primarily by the temperature of the room air and by the temperature of the air drawn in, and substantially independent of the temperature of the air stream delivered by the blower.

5. Air treating equipment comprising, in combination: a housing; means for mounting said housing in the opening made available by a partly opened window sash; a motor and blower located in said housing and subdividing the space inside said housing into portions; an electric heater in one of said portions; said blower being arranged to withdraw air from the portion containing said heater, and expel it from said housing into the room; another subdivided portion being a relatively stagnant air space; a control thermostat arranged to connect and disconnect said heater at predetermined thermostat temperatures; said thermostat being located in said relatively stagnant air space.

6. Air treating equipment comprising, in combination: a housing; means for subdividing the space in said housing into two portions; an electric heater in a first one of said portions; a second portion being a relatively stagnant air space; a control thermostat arranged to connect and disconnect said heater at a predetermined thermostat temperature; said thermostat being located in the said relatively stagnant air space; and power means for delivering air from said first space portion.

7. Equipment according to claim 6 in which said power means are inside said housing and constitute said subdividing means.

8. Equipment according to claim 6 in which said power means are arranged to deliver more air when said heater is drawing current.

9. Equipment according to claim 6 in which said first space portion has two inlets; one of said inlets being arranged to receive air from a room being heated; the other inlet being arranged to receive air from outside; whereby the housing temperature effective on said stagnant air space and thermostat is a combined function of the inside and outside temperatures.

10. Equipment according to claim 6 in which said first space portion has two inlets; one of said inlets being arranged to receive air from a room being heated; the other inlet being arranged to receive air from outside; and operator-controlled means for adjusting the proportion of air received from the different inlets.

11. Equipment according to claim 10 in which the inlet for outside air is substantially insulated from the housing; whereby outside air temperatures have relatively little effect on the housing temperature except for the air taken into the housing.

References Cited in the file of this patent
UNITED STATES PATENTS

| | | |
|---|---|---|
| 2,471,784 | Seifner et al. | May 31, 1949 |
| 2,578,819 | Mast et al. | Dec. 18, 1951 |